United States Patent

Lee et al.

(10) Patent No.: US 9,817,272 B2
(45) Date of Patent: Nov. 14, 2017

(54) LIQUID CRYSTAL DISPLAY DEVICE

(71) Applicant: Samsung Display Co., Ltd., Yongin, Gyeonggi-Do (KR)

(72) Inventors: Se Hyun Lee, Seoul (KR); Hak Sun Chang, Yongin-si (KR); Cheol Shin, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 15 days.

(21) Appl. No.: 14/932,829

(22) Filed: Nov. 4, 2015

(65) Prior Publication Data

US 2016/0342040 A1 Nov. 24, 2016

(30) Foreign Application Priority Data

May 20, 2015 (KR) .................. 10-2015-0070664

(51) Int. Cl.
*G02F 1/1343* (2006.01)
*G02F 1/1337* (2006.01)

(52) U.S. Cl.
CPC ........... *G02F 1/133707* (2013.01); *G02F 2001/134345* (2013.01)

(58) Field of Classification Search
None
See application file for complete search history.

(56) References Cited

U.S. PATENT DOCUMENTS

| 2011/0063557 A1* | 3/2011 | Kim ................ G02F 1/134309 349/141 |
| 2012/0307190 A1* | 12/2012 | Zhang .............. G02F 1/133707 349/142 |
| 2013/0300991 A1* | 11/2013 | Lim .................. G02F 1/13624 349/123 |
| 2014/0043571 A1 | 2/2014 | Chang et al. |
| 2015/0009442 A1* | 1/2015 | Lee .................. G02F 1/134336 349/43 |
| 2015/0009465 A1* | 1/2015 | Park ................ G02F 1/133707 349/139 |
| 2015/0029449 A1* | 1/2015 | Woo ................. G02F 1/133512 349/110 |
| 2015/0036073 A1* | 2/2015 | Im ..................... G02F 1/1333 349/48 |

FOREIGN PATENT DOCUMENTS

| KR | 10-2008-0032768 | 4/2008 |
| KR | 10-2010-0072852 | 7/2010 |
| KR | 10-2013-0042242 | 4/2013 |
| KR | 10-2015-0005000 | 1/2015 |
| KR | 10-2015-0084230 | 7/2015 |

* cited by examiner

*Primary Examiner* — Ryan Crockett
(74) *Attorney, Agent, or Firm* — Innovation Counsel LLP

(57) ABSTRACT

A display device may include a liquid crystal layer and a pixel electrode that overlaps the liquid crystal layer. The pixel electrode may include a first bar, a second bar, a third bar, and a plurality of first-type branches. The second bar may be directly connected to a first end of the first bar. The third bar may be directly connected to a first end of the second bar or directly connected to a second end of the first bar. The first-type branches may be slanted with respected to the first bar and may be positioned between the third bar and at least one of the first bar and the second bar.

19 Claims, 12 Drawing Sheets

LIQUID CRYSTAL DISPLAY DEVICE

RELATED APPLICATION(S)

This application claims priority to and the benefit of Korean Patent Application No. 10-2015-0070664 filed in the Korean Intellectual Property Office on May 20, 2015; the entire contents of the Korean Patent Application are incorporated herein by reference.

BACKGROUND (a) Technical Field

The technical field relates to a liquid crystal display device.

(b) Description of the Related Art

A liquid crystal display device may include a pixel electrode, a common electrode, and a liquid crystal layer. The liquid crystal display may generate an electric field in a liquid crystal layer by applying a voltage to the electrodes, to determine orientations of liquid crystal molecules of the liquid crystal layer, for controlling transmission of incident light, thereby displaying an image. Visibility of the displayed image at different positions (or different viewing angles) with respect to the display device may be substantially different. As a result, visibility of the displayed image may be unsatisfactory. The above information disclosed in this Background section is provided to enhance understanding of the background of this application. The Background section may contain information that does not form the prior art that is already known in this country to a person of ordinary skill in the art.

SUMMARY

Embodiments may be related to a liquid crystal display device with satisfactory side visibility.

An embodiment may be related to a display device. The display device may include a liquid crystal layer and a pixel electrode. The pixel electrode may overlap the liquid crystal layer. The pixel electrode may include a first bar, a second bar, a third bar, and a plurality of first-type branches. The second bar may be directly connected to a first end of the first bar. The third bar may be directly connected to a first end of the second bar or directly connected to a second end of the first bar. The first-type branches may be slanted with respected to the first bar and may be positioned between the third bar and at least one of the first bar and the second bar.

The third bar may be directly connected to the first end of the second bar and may extend parallel to the first bar.

The third bar may be directly connected to the second end of the first bar and may extend parallel to the second bar.

The pixel electrode may include a fourth bar. A first end of the third bar may be directly connected to the first end of the second bar. A second end of the third bar may be directly connected to a first end of the fourth bar. A second end of the fourth bar may be directly connected to a first-type branch among the first-type branches.

The pixel electrode may include a fourth bar. The third bar may be directly connected to the first end of the second bar. The fourth bar may be directly connected to a second end of the second bar. The first bar may be positioned between the third bar and the fourth bar and may extend parallel to the fourth bar.

The pixel electrode may include a fourth bar and a second-type branch. The first bar may be positioned between the plurality of first-type branches and the second-type branch. The second-type branch may be slanted with respect to the first bar and may be directly connected to each of the first bar and the fourth bar.

The fourth bar may be shorter than the third bar.

A first end of the second-type branch may be directly connected to the first bar. A second end of the second-type branch may be directly connected to the fourth bar.

The pixel electrode may include a third-type branch. The third-type branch may extend parallel to the second-type branch and may be electrically connected through the second-type branch to the fourth bar.

The third-type branch may be shorter than the second-type branch and may be positioned between the first bar and the fourth bar.

The second-type branch may be longer than the third-type branch and may be positioned between the third-type branch and the second bar.

The third-type branch may be shorter than the second-type branch and may be positioned between the second-type branch and the second bar.

The third-type branch may be shorter than the second-type branch and may be directly connected to the second bar.

Distances from the first-type branches to the third bar may be equal to one another.

The display device may include a transistor that is electrically connected to the pixel electrode. The third bar may be positioned between the transistor and the plurality of first-type branches in a plan view of the display device.

The pixel electrode may include a fourth bar, a fifth bar, a sixth bar, and a plurality of second-type branches. The fifth bar may be directly connected to a first end of the fourth bar. The sixth bar may be directly connected to a first end of the fifth bar or directly connected to a second end of the fourth bar. The sixth bar may be electrically connected to the third bar. The second-type branches may be slanted with respected to the fourth bar and may be positioned between the sixth bar and at least one of the fourth bar and the fifth bar.

The third bar may be positioned at a first edge of the pixel electrode. The sixth bar may be poisoned at a second edge of the pixel electrode. The second edge of the pixel electrode may be opposite the first edge of the pixel electrode.

At least one of the plurality of first-type branches and the plurality of second-type branches and at least one of the first bar and the fourth bar may be positioned between the third bar and the sixth bar.

The pixel electrode may include a fourth bar, a fifth bar, a sixth bar, and a plurality of second-type branches. The fifth bar may be directly connected to a first end of the fourth bar. The sixth bar may be directly connected to a first end of the fifth bar or directly connected to a second end of the fourth bar. The sixth bar may be electrically insulated from the third bar. The second-type branches may be slanted with respected to the fourth bar and may be positioned between the sixth bar and at least one of the fourth bar and the fifth bar.

The third bar may be positioned at a first edge of the pixel electrode. The sixth bar may be poisoned at a second edge of the pixel electrode. The second edge of the pixel electrode may be opposite the first edge of the pixel electrode.

The display device may include a gate line, a first transistor, and a second transistor. The first transistor may be electrically connected to each of the third bar and the gate line. The second transistor may be electrically connected to each of the sixth bar and the gate line. The first transistor and the second transistor may be positioned between the third bar and the sixth bar in a plan view of the display device.

An may be related to a display that includes the following elements: a first substrate and a second substrate that face each other; a pixel electrode disposed on the first substrate; a common electrode disposed on the second substrate; a liquid crystal layer disposed between the first substrate and the second substrate. The pixel electrode includes the following elements: a T-shaped stem having a horizontal stem and a vertical stem; a plurality of minute branches extending from the T-shaped stem; and an outer stem directly connected to one end portion of the T-shaped stem, and disposed at an edge of a pixel area.

The outer stem may have a rod-like shape.

The outer stem may be directly connected to a minute branch near a first end portion of the horizontal stem and may be directly connected to the vertical stem, which is directly connected to a second end portion of the horizontal stem.

Some minute branches positioned between the minute branch and the vertical stem may be separated from the outer stem at a predetermined distance.

The pixel electrode may include two T-shaped stems, and two pluralities of minute branches may extend from each of the T-shaped stems.

One outer stem may be connected to a first end portion of each of the T-shaped stems.

Two outer stems may be respectively disposed at upper and lower edges of the pixel area and may extend parallel to the horizontal stem.

The pixel electrode may include a first subpixel electrode and a second subpixel electrode, to which different voltages are applied, and each of the first subpixel electrode and the second subpixel electrode may include a T-shaped stem, a plurality of minute branches, and an outer stem.

An outer stem may extend from a first end portion of a horizontal stem.

The outer stem may be separated from some minute branches by at a predetermined distance.

The outer stem may extend parallel to the vertical stem.

Two outer stem may be respectively disposed at left and right edges of the pixel area.

The pixel electrode may further include an auxiliary stem positioned at a central portion of the pixel area.

The outer stem and the auxiliary stem may each have a rod-like shape.

The pixel electrode may include two T-shaped stems, and the auxiliary stem may be positioned between the two T-shaped stems.

One auxiliary stem may extend from each of the T-shaped stems.

The auxiliary stem may be directly connected to a minute branch.

The outer stem and the auxiliary stem may extend parallel to the horizontal stem.

The pixel electrode may include a first subpixel electrode and a second subpixel electrode, to which different voltages are applied. The first subpixel electrode may include a T-shaped stem and may include first-type minute branches extending from the T-shaped stem. The second subpixel electrode may include a cross-shaped stem and may include second-type minute branches extending from the cross-shaped stem.

A data voltage applied to the first subpixel electrode may be higher than a data voltage applied to the second subpixel electrode.

DETAILED DESCRIPTION

Figure 1:
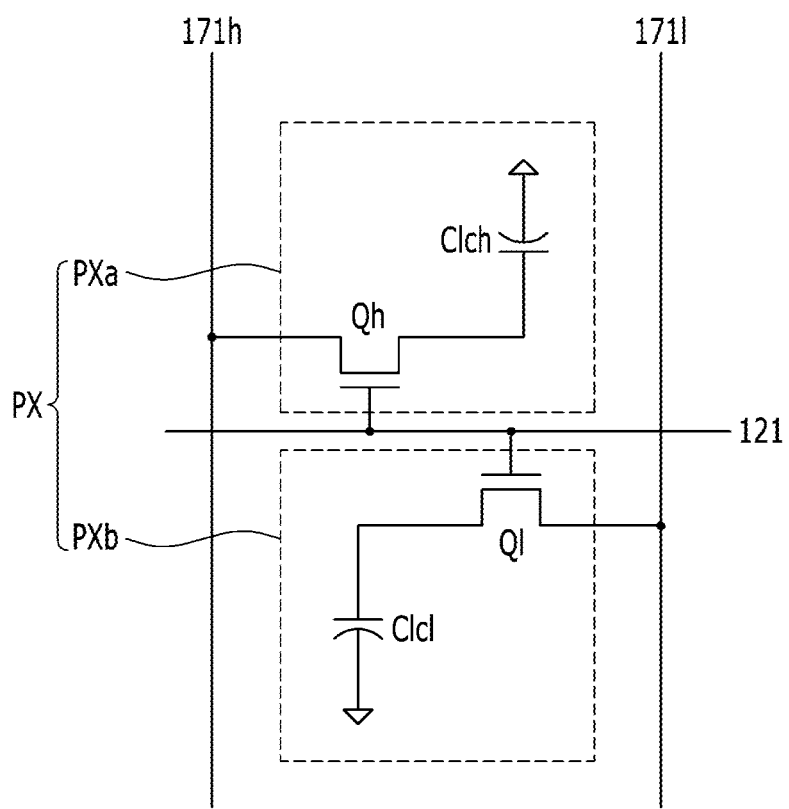
FIG. 1 is a schematic equivalent circuit diagram of a pixel of a liquid crystal display device, or "liquid crystal display" for conciseness, according to an embodiment.

Some embodiments are described with reference to the accompanying drawings. As those skilled in the art would realize, the described embodiments may be modified in various ways.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

In the drawings, thicknesses of layers, films, panels, regions, etc., may be exaggerated for clarity. Like reference numerals may designate like elements in this application. When a first element (such as a layer, film, region, or substrate) is referred to as being "on" a second element, the first element can be directly on the second element, or one or more intervening elements may also be present. In contrast, when a first element is referred to as being "directly on" a second element, there are no intervening elements intentionally provided between the first element and the second element.

A drawing and related description may use a particular position and/or orientation of a device as an example. The device may have various positions and/or orientations.

In this application, a "stem" or "bar" may mean a straight piece that is longer than it is wide.

FIG. 1 is a schematic equivalent circuit diagram of a pixel of a liquid crystal display device, or "liquid crystal display" for conciseness according to an embodiment.

Referring to FIG. 1, the liquid crystal display includes a plurality of signal lines 121, 171h, and 171l. A pixel area PX may be defined by these signal lines 121, 171h and 171l. The pixel area PX may include a first subpixel area PXa and a second subpixel area PXb.

The signal lines 121, 171h, and 171l include a gate line 121 for transferring gate signals, a first data line 171h for transferring a first data voltage, and a second data line 171l for transferring a second data voltage different from the first voltage.

A first switching element Qh is in electrical connection with the gate line 121 and the first data line 171h, and a second switching element Ql is in electrical connection with the gate line 121 and the second data line 171l.

A first liquid crystal capacitor Clch connected to the first switching element Qh is located in the first subpixel area PXa, and a second liquid crystal capacitor Clcl connected to the second switching element Ql is located in the second subpixel area PXb.

A first terminal of the first switching element Qh is connected to the gate line 121, a second terminal thereof is connected to the first data line 171h, and a third terminal thereof is connected to the first liquid crystal capacitor Clch.

A first terminal of the second switching element Ql is connected to the gate line 121, a second terminal thereof is connected to the second data line 171l, and a third terminal thereof is connected to the second liquid crystal capacitor Clcl.

An operation of the liquid crystal display according to the exemplary embodiment is described as follows: When a gate-on voltage is applied to the gate line 121, the first switching element Qh and the second switching element Ql are turned on, and the liquid crystal capacitors Clch and Clcl are charged by different data voltages transferred through the data lines 171h and 171l. The data voltage transferred by the second data line 171l may be lower than the data voltage transferred by the first data line 171h. Accordingly, the second liquid crystal capacitor Clcl can be charged by a lower voltage than that of the first liquid crystal capacitor Clch. Advantageously, satisfactory side visibility of an image displayed by the liquid crystal display may be attained.

Figure 2:
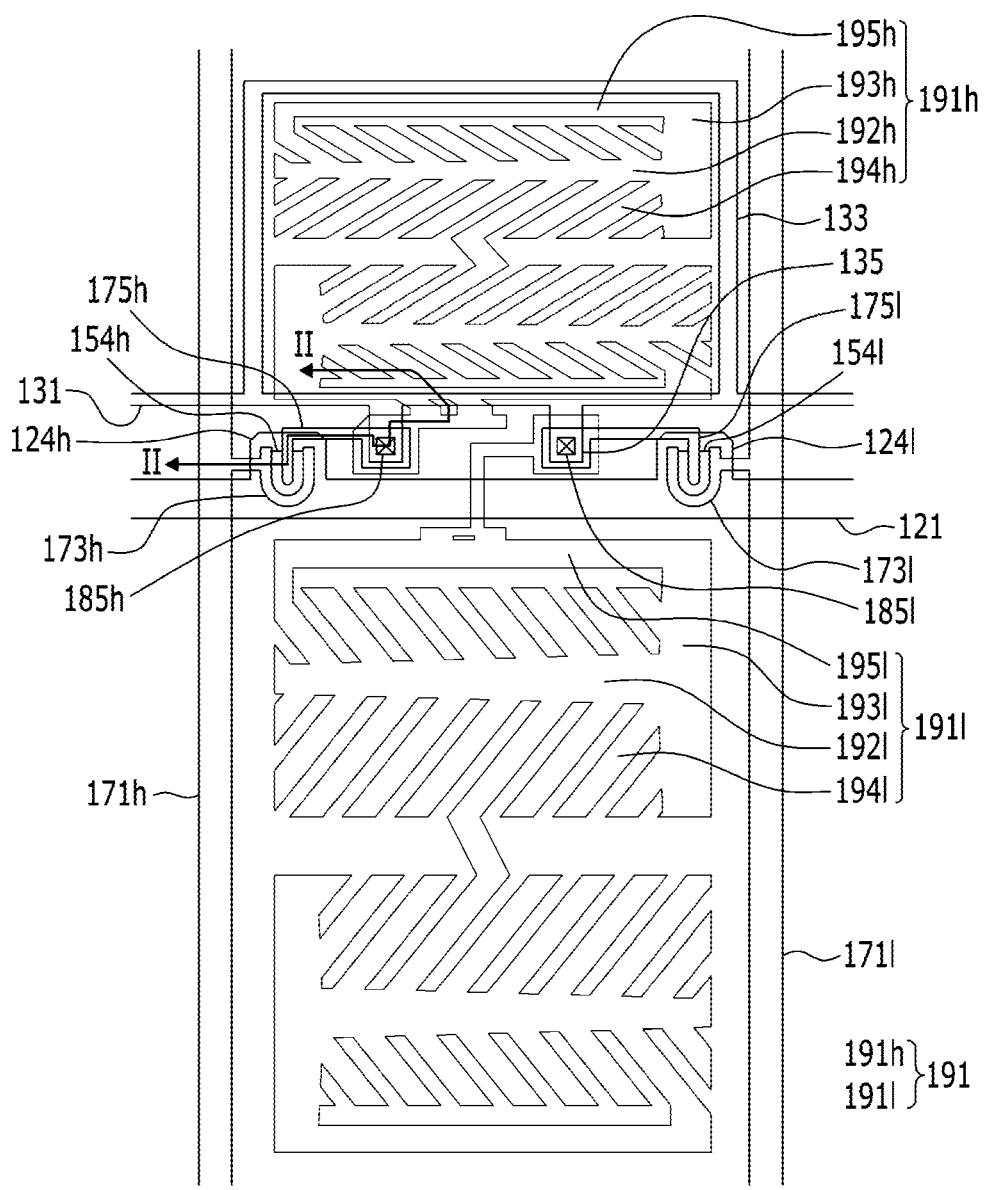
FIG. 2 is a schematic plan view illustrating one pixel of a liquid crystal display according to an embodiment.
Figure 3:
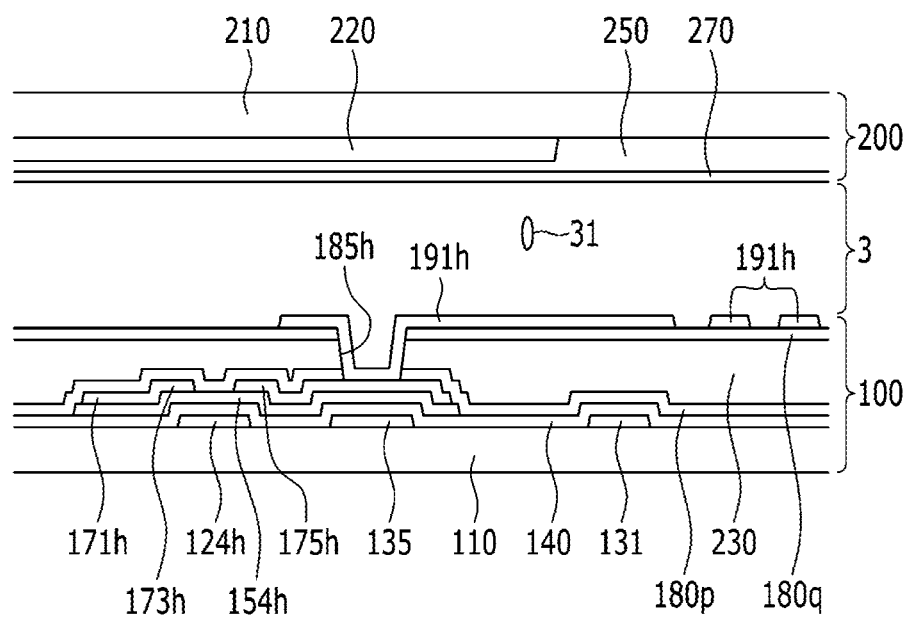
FIG. 3 is a schematic cross-sectional view cut along a line III-III indicated in FIG. 2 according to an embodiment.
Figure 4:
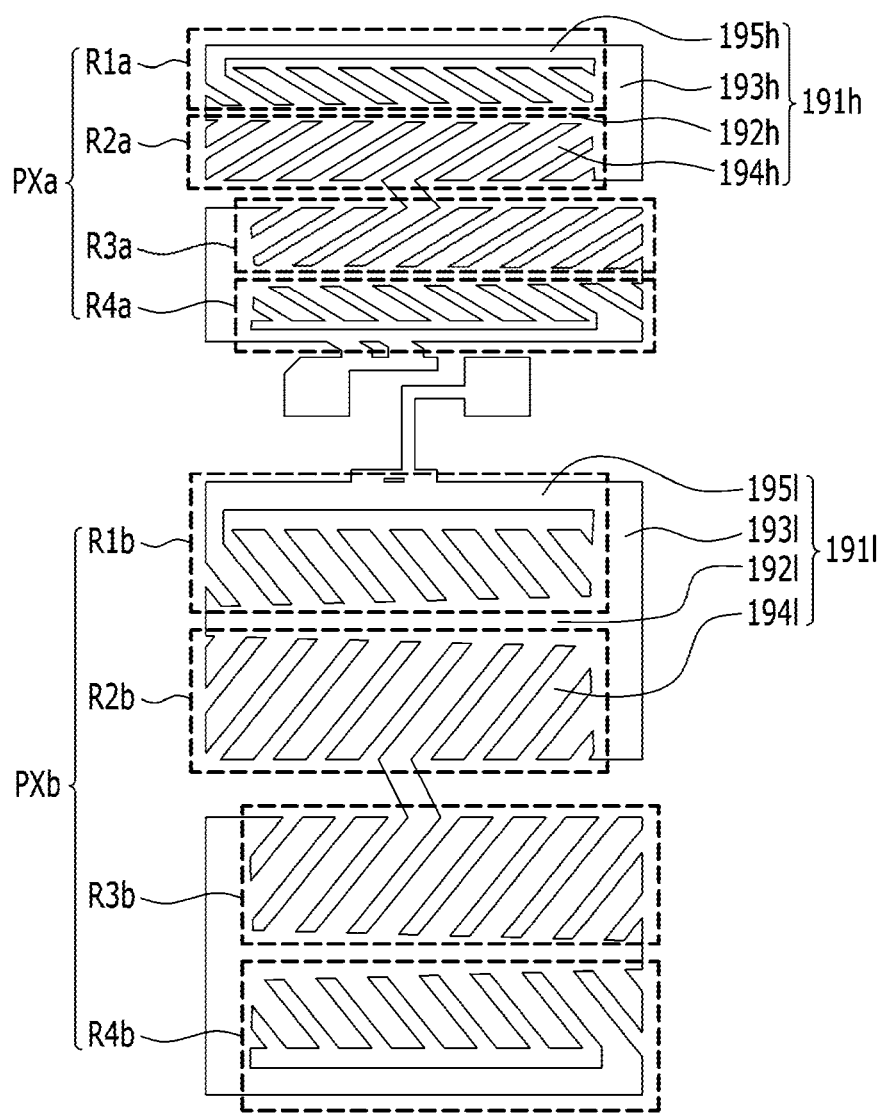
FIG. 4 is a schematic plan view illustrating some constituent elements illustrated in FIG. 2.

Referring to FIG. 2 to FIG. 4, one pixel area of a liquid crystal display according to an embodiment is described.

FIG. 2 is a schematic plan view illustrating one pixel of a liquid crystal display according to an embodiment, FIG. 3 is a schematic cross-sectional view provided along a line III-III indicated in FIG. 2 according to an embodiment, and FIG. 4 is a schematic plan view illustrating some constituent elements illustrated in FIG. 2. FIG. 4 illustrates pixel electrodes of the liquid crystal display according to an embodiment.

Referring to FIG. 2 to FIG. 4, the liquid crystal display includes a lower display panel 100 and an upper display panel 200 configured to face each other, and a liquid crystal layer 3 interposed between these two display panels 100 and 200.

First, the lower display panel 100 will be described.

A gate line 121, and a first gate electrode 124h and a second gate electrode 124l, which protrude from the gate line 121, are formed on a first substrate 110 made of transparent glass, plastic, or the like.

The gate line 121 mainly extends in a horizontal direction to transmit a gate signal.

A sustain electrode line 131 and sustain electrodes 133 and 135 protruding from the sustain electrode line 131 may be further formed on the first substrate 110.

The sustain electrode line 131 extends in a direction parallel to the gate line 121, and is formed to be separated from the gate line 121. A predetermined voltage may be applied to the sustain electrode line 131. The sustain electrode 133 protruding above the sustain electrode line 131 is formed to surround the boundary of a first subpixel electrode 191h, which will be described later. The sustain electrode 135 protruding below the sustain electrode line 131 overlaps a first drain electrode 175h and a second drain electrode 175l, which will be described later.

A gate insulating layer 140 is formed on the gate line 121, the first gate electrode 124h, the second gate electrode 124l, the sustain electrode line 131, and the sustain electrodes 133 and 135. The gate insulating layer 140 may be formed of an inorganic insulating material such as at least one of a silicon nitride (SiNx), a silicon oxide (SiOx), and the like. The gate insulating layer 140 may be formed as a single layer or multiple layers.

A first semiconductor 154h and a second semiconductor 154l are formed on the gate insulating layer 140. The first semiconductor 154h may be disposed on the first gate electrode 124h, and the second semiconductor 154l may be disposed on the second gate electrode 124l. The first semiconductor 154h may also be disposed below the first data line 171h, and the second semiconductor 154l may also be disposed below the second data line 171l. The first semiconductor 154h and the second semiconductor 154l may be made of amorphous silicon, polycrystalline silicon, a metal oxide, and the like.

Ohmic contact members (not illustrated) may be further formed on each of the first semiconductor 154h and the second semiconductor 154l. The ohmic contact members may be formed of a material such as a silicide or n+ hydrogenated amorphous silicon doped with an n-type impurity in high concentration.

On the first semiconductor 154h, the second semiconductor 154l, and the gate insulating layer 140, the first data line 171h, the second data line 171l, a first source electrode 173h, the first drain electrode 175h, a second source electrode 173l, and the second drain electrode 175l are formed.

The first data line 171h and the second data line 171l may transfer data signals, may mainly extend in a vertical direction, and may cross the gate line 121 and the storage electrode line 131.

The first data line 171h and the second data line 171l transfer different data voltages. For example, the data voltage transferred by the second data line 171l is lower than the data voltage transferred by the first data line 171h.

The first source electrode 173h is formed to protrude from the first data line 171h above the first gate electrode 124h, and the second source electrode 173l is formed to protrude from the second data line 171l above the second gate electrode 124l. The first drain electrode 175h and the second drain electrode 175l each include one wide end portion with the other end portion having a rod shape. The wide end portions of the first drain electrode 175h and the second drain electrode 175l overlap the sustain electrode 135 protruding under the sustain electrode line 131. Each of the other rod shape end portions of the first drain electrode 175h and the second drain electrode 175l is partially surrounded by the first source electrode 173h and the second source electrode 173l.

The first and second gate electrodes 124h and 124l, the first and second source electrodes 173h and 173l, and the first and second drain electrodes 175h and 175l constitute the respective first and second thin film transistors (TFT) Qh and Ql together with the first and second semiconductors 154*h* and 154*l*. In this case, a channel of the thin film transistor is formed in the respective semiconductors 154*h* and 154*l* between the source electrodes 173*h* and 173*l* and the drain electrodes 175*h* and 175*l*, respectively.

A first passivation layer 180*p* is formed on the first data line 171*h*, the second data line 171*l*, the first source electrode 173*h*, the first drain electrode 175*h*, the first semiconductor 154*h* exposed between the first source electrode 173*h* and the first drain electrode 175*h*, the second source electrode 173*l*, the second drain electrode 175*l*, and the second semiconductor 154*l* exposed between the second source electrode 173*l* and the second drain electrode 175*l*. The first passivation layer 180*p* may be formed of an inorganic insulating material such as a silicon nitride (SiNx), a silicon oxide (SiOx), and the like.

A color filter 230 is formed on the first passivation layer 180*p*. The color filter 230 may be formed in a column direction.

Each color filter 230 may display one of three primary colors, such as red, green, and blue. The color filter 230 is not limited to the three primary colors of red, green, and blue, but may also display cyan, magenta, yellow, and white-based colors.

A second passivation layer 180*q* is formed on the color filter 230. The second passivation layer 180*q* may be formed of an inorganic insulating material such as at least one of a silicon nitride (SiNx), a silicon oxide (SiOx), and the like.

The color filter 230 may not be formed on the lower display panel 100, but may be formed on the upper display panel. In addition, the second passivation layer 180*q* may be omitted.

In the first passivation layer 180*p*, the color filter 230, and the second passivation layer 180*q*, a first contact hole 185*h* is formed to expose the wide end portion of the first drain electrode 175*h*, and a second contact hole 185*l* is formed to exposed the wide end portion of the second drain electrode 175*l*.

A pixel electrode 191 is formed on the second passivation layer 180*q*. The pixel electrode 191 may be made of a transparent metal oxide such as at least one of indium tin oxide (ITO), indium zinc oxide (IZO), and the like.

The pixel electrode 191 includes a first subpixel electrode 191*h* and a second subpixel electrode 191*l*. The first subpixel electrode 191*h* is disposed on the first subpixel area PXa, and the second subpixel electrode 191*l* is disposed on the second subpixel area PXb.

The first subpixel electrode 191*h* is connected to the first drain electrode 175*h* through the first contact hole 185*h*, and the second subpixel electrode 191*l* is connected to the second drain electrode 175*l* through the second contact hole 185*l*. Accordingly, when the first thin film transistor Qh and the second thin film transistor Ql are turned on, different data voltages are applied to the first subpixel electrode 191*h* and the second subpixel electrode 191*l* from the first drain electrode 175*h* and the second drain electrode 175*l*, respectively.

The overall shape of each of the first subpixel electrode 191*h* and the second subpixel electrode 191*l* is quadrangular. The first subpixel electrode 191*h* and the second subpixel electrode 191*l* respectively include T-shaped stems respectively including horizontal stems (or bars) 192*h* and 192*l* and vertical stems (or bars) 193*h* and 193*l*. In addition, the first sub-pixel electrode 191*h* and the second sub-pixel electrode 191*l* further include a plurality of minute branches 194*h* and a plurality of minute branches 194*l*, which extend from the horizontal stems 192*h* and 192*l* and the vertical stems 193*h* and 193*l*. The first subpixel electrode 191*h* and the second subpixel electrode 191*l* each may include two T-shaped stems, and the minute branches 194*h* and 194*l* extend from the T-shaped stems. The first subpixel electrode 191*h* and the second subpixel electrode 191 further include outer stems (or bars) 195*h* and 195*l*, which are respectively connected to end portions of the T-shaped stems.

The horizontal stems 192*h* and 192*l* mainly extend in a horizontal direction, which is a direction parallel to the gate line 121.

The first subpixel area PXa and the second subpixel area PXb respectively include first areas R1*a* and R1*b*, second areas R2*a* and R2*b*, third areas R3*a* and R3*b*, and fourth areas R4*a* and R4*b*. When viewed from a plan view, two T-shaped stems are vertically disposed in each of the first subpixel area PXa and the second subpixel area PXb. The first areas R1*a* and R1*b* are respectively separated from the second areas R2*a* and R2*b* by the horizontal stems 192*h* and 192*l* of the T-shaped stem positioned at upper sides. Similarly, the third areas R3*a* and R3*b* are respectively separated from the fourth areas R4*a* and R4*b* by the horizontal stems 192*h* and 192*l* of the T-shaped stem positioned at a lower side.

The vertical stems 193*h* and 193*l* mainly extend in a vertical direction, which is a direction parallel to the data lines 171*h* and 171*l*, respectively. The vertical stems 193*h* and 193*l* are each positioned at one edge of the first subpixel area PXa and the second subpixel area PXb. For example, the vertical stems 193*h* and 193*l* may be positioned at left and right edges of the first subpixel area PXa and the second subpixel area PXb. Specifically, the vertical stems 193*h* and 193*l* of the T-shaped stem positioned at the upper side may be positioned at the right edges of the first subpixel area PXa and the second subpixel area PXb. The vertical stems 193*h* and 193*l* of the T-shaped stem positioned at the lower side may be positioned at the left edges of the first subpixel area PXa and the second subpixel area PXb. However, the present embodiment is not limited thereto, and the positions of the vertical stems 193*h* and 193*l* may be oppositely determined Specifically, the vertical stems 193*h* and 193*l* of the T-shaped stem positioned at the upper side may be positioned at the left edges of the first subpixel area PXa and the second subpixel area PXb, and the vertical stems 193*h* and 193*l* of the T-shaped stem positioned at the lower side may be positioned at the right edges of the first subpixel area PXa and the second subpixel area PXb.

The vertical stems 193*h* and 193*l* are each connected to one end portion of the horizontal stems 192*h* and 192*l*. For example, the vertical stems 193*h* and 193*l* of the T-shaped stem positioned at the upper side may be connected to right end portions of the horizontal stems 192*h* and 192*l*. The vertical stems 193*h* and 193*l* of the T-shaped stem positioned at the lower side may be connected to left end portions of the horizontal stems 192*h* and 192*l*.

The minute branches 194*h* and 194*l* extend in an oblique direction with respect to the horizontal stems 192*h* and 192*l* and the vertical stems 193*h* and 193*l*

For example, the minute branches 194*h* and 194*l* may form an angle of about 40 to 50 degrees with respect to the horizontal stems 192*h* and 192*l*.

The minute branches 194*h* and 194*l* extend in four directions from each of the T-shaped stems. The minute branches 194*h* and 194*l* extend in different directions in the first areas R1*a* and R1*b*, the second areas R2*a* and R2*b*, the third areas R3*a* and R3*b*, and the fourth areas R4*a* and R4*b*. Specifically, in the first areas R1*a* and R1*b*, the minute branches 194*h* and 194*l* may extend in an upper left direction from the horizontal stems 192*h* and 192*l* and the vertical stems 193*h* and 193*l*. In the second areas R2*a* and R2*b*, the minute branches 194*h* and 194*l* may extend in a lower left direction from the horizontal stems 192*h* and 192*l* and the vertical stems 193*h* and 193*l*. In the third areas R3*a* and R3*b*, the minute branches 194*h* and 194*l* may extend in an upper right direction from the horizontal stems 192*h* and 192*l* and the vertical stems 193*h* and 193*l*. In the fourth areas R4*a* and R4*b*, the minute branches 194*h* and 194*l* may extend in a lower right direction from the horizontal stems 192*h* and 192*l* and the vertical stems 193*h* and 193*l*.

Each of the outer stems 195*h* and 195*l* may be directly connected to one end portion of one of the T-shaped stems. The outer stems 195*h* and 195*l* are positioned at edges of the first subpixel area PXa and the second subpixel area PXb. Specifically, the outer stems 195*h* and 195*l* may be positioned at upper and lower edges of the first subpixel area PXa and the second subpixel area PXb. The outer stems 195*h* and 195*l* have rod-like shapes or bar structures. The outer stems 195*h* and 195*l* extend straight parallel to the horizontal stems 192*h* and 192*l*. The outer stems 195*h* and 195*l* may connect the vertical stems 193*h* and 193*l* to minute branches 194*h* and 194*l*. Outer stems 195*h* and 195*l* may be directly connected to minute branches 194*h* and 194*l*, "directly-connected minute branches 194*h* and 194*l*", near first end portions of horizontal stems 192*h* and 192*l* and may be directly connected to vertical stems 193*h* and 193*l* near second end portions of the horizontal stems 192*h* and 192*l*. Minute branches 194*h* and 194*l* not directly connected to outer stems 195*h* and 195*l* may be positioned between the directly-connected minute branches 194*h* and 194*l* and vertical stems 193*h* and 193*l* and may be separated from the outer stems 195*h* and 195*l* by a constant predetermined distance.

In an embodiment, the pixel electrode 191 includes the first subpixel electrode 191*h* and the second subpixel electrode 191*l*, and the first subpixel electrode 191*h* and second subpixel electrode 191*l* include the T-shaped stems, the minute branches 194*h* and 194*l*, and the outer stems 195*h* and 195*l*. In an embodiment, the pixel electrode 191 may include two or more subpixel electrodes, or may be a single pixel electrode. In an embodiment, some of the two or more subpixel electrodes may include T-shaped stems, minute branches, and outer stems, and the other subpixel electrodes may have different shapes.

Next, the second display panel 200 is described.

A light blocking member 220 is formed on a second substrate 210 made of transparent glass, plastic, or the like. The light blocking member 220 is also called a black matrix and serves to prevent light leakage. The light blocking member 220 may overlap the gate line 121, the data lines 171*h* and 171*l*, and the thin film transistors Qh and Ql.

An overcoat 250 may be formed on the light blocking member 220. The overcoat 250 serves to planarize a top surface of the second substrate 210.

A common electrode 270 is formed on the overcoat 250. The common electrode 270 may be made of a transparent metal oxide such as indium tin oxide (ITO), indium zinc oxide (IZO), and the like. The common electrode 270 may be formed on the entire surface of the second substrate 210.

The liquid crystal layer 3 may include a plurality of liquid crystal molecules 31 having negative dielectric anisotropy.

When a predetermined voltage is applied to the pixel electrode 191 and the common electrode 270, an electric field is generated between the lower display panel 100 and the upper display panel 200. The electric field includes a vertical component of an approximately vertical direction with respect to the surfaces of the lower display panel 100 and the upper display panel 200, and the liquid crystal molecules 31 incline in an approximately horizontal direction with respect to the surfaces of the lower display panel 100 and the upper display panel 200.

A fringe field may be generated between edges of the horizontal stems 192*h* and 192*l*, the vertical stems 193*h* and 193*l*, the micro branches 194*h* and 194*l*, and the common electrode 270 to allow the liquid crystal molecules 31 to incline with respect to the connection portions of the horizontal stems 192*h* and 192*l* and the vertical stems 193*h* and 193*l*, and in an approximate horizontal direction with respect to the micro branches 194*h* and 194*l*.

In the first areas R1*a* and R1*b*, the liquid crystal molecules 31 are inclined in a lower right direction. In the second areas R2*a* and R2*b*, the liquid crystal molecules 31 are inclined in an upper right direction. In the third areas R3*a* and R3*b* the liquid crystal molecules 31 are inclined in a lower left direction. In the fourth areas R4*a* and R4*b*, the liquid crystal molecules 31 are inclined in an upper left direction.

In an embodiment, since outer stems 195*h* and 195*l* are formed at edges of the first subpixel area PXa and the second subpixel area PXb, liquid crystal molecules 31 are also inclined at the edges in a direction substantially parallel to the minute branches 194*h* and 194*l*. Accordingly, liquid crystal molecules 31 positioned near the horizontal stems 192*h* and 192*l* in the first subpixel area PXa and the second subpixel area PXb may be oriented at angles of about 45 degrees with respect to the horizontal stems 192*h* and 192*l* (in a plan view), and liquid crystal molecules 31 positioned at edges of the first subpixel area PXa and the second subpixel area PXb also may be oriented at angles of about 45 degrees with respect to the horizontal stems 192*h* and 192*l* (in the plan view). Since most of the liquid crystal molecules 31 are inclined at angles of about 45 degrees (in the plan view), characteristics of an image viewed in front of the center of the liquid crystal display may be similar to those of the image viewed from a side (or lateral) position with respect to the liquid crystal display. Thus, satisfactory side visibility may be attained.

Enhancement of side visibility according to an embodiment is described with reference to FIG. 5 to FIG. 8.

Figure 5:
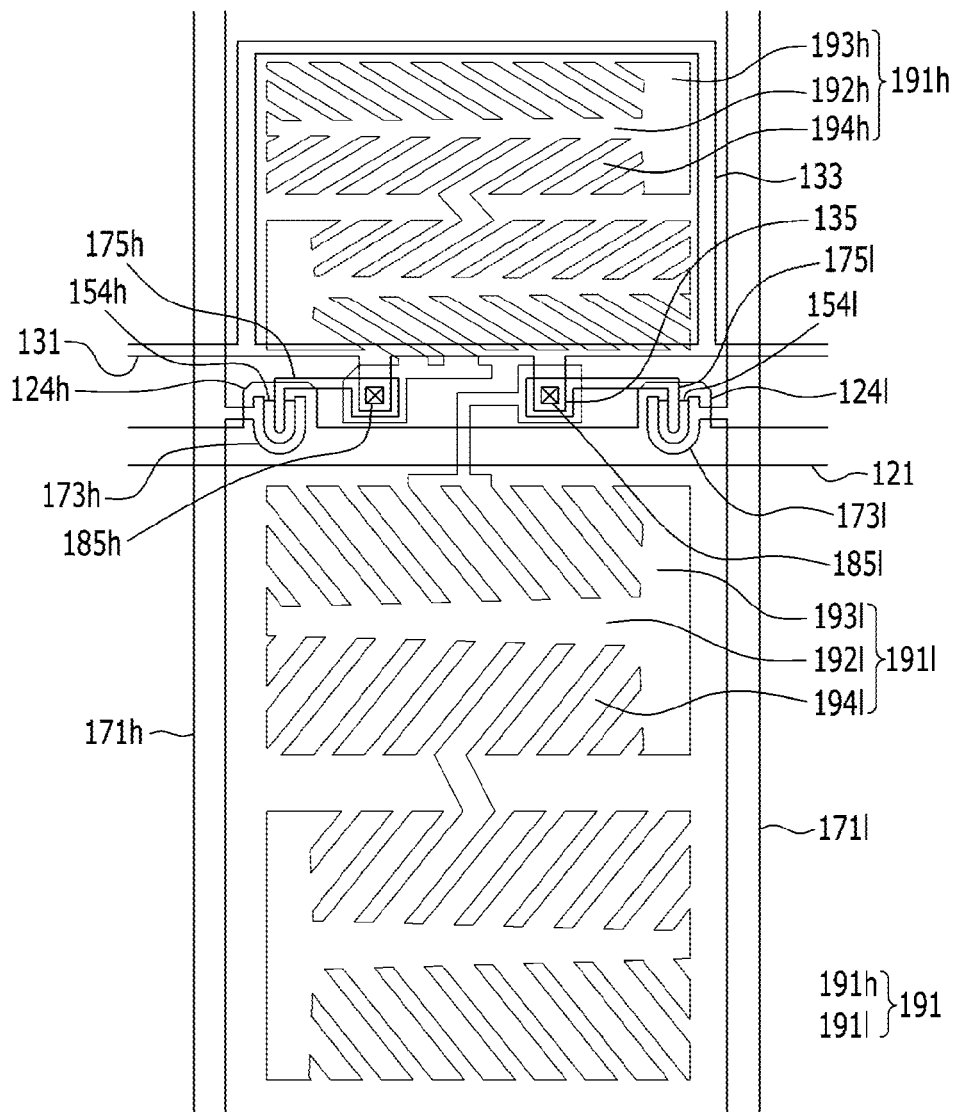
FIG. 5 is a schematic plan view illustrating one pixel of a liquid crystal display according to a comparative embodiment.
Figure 6:
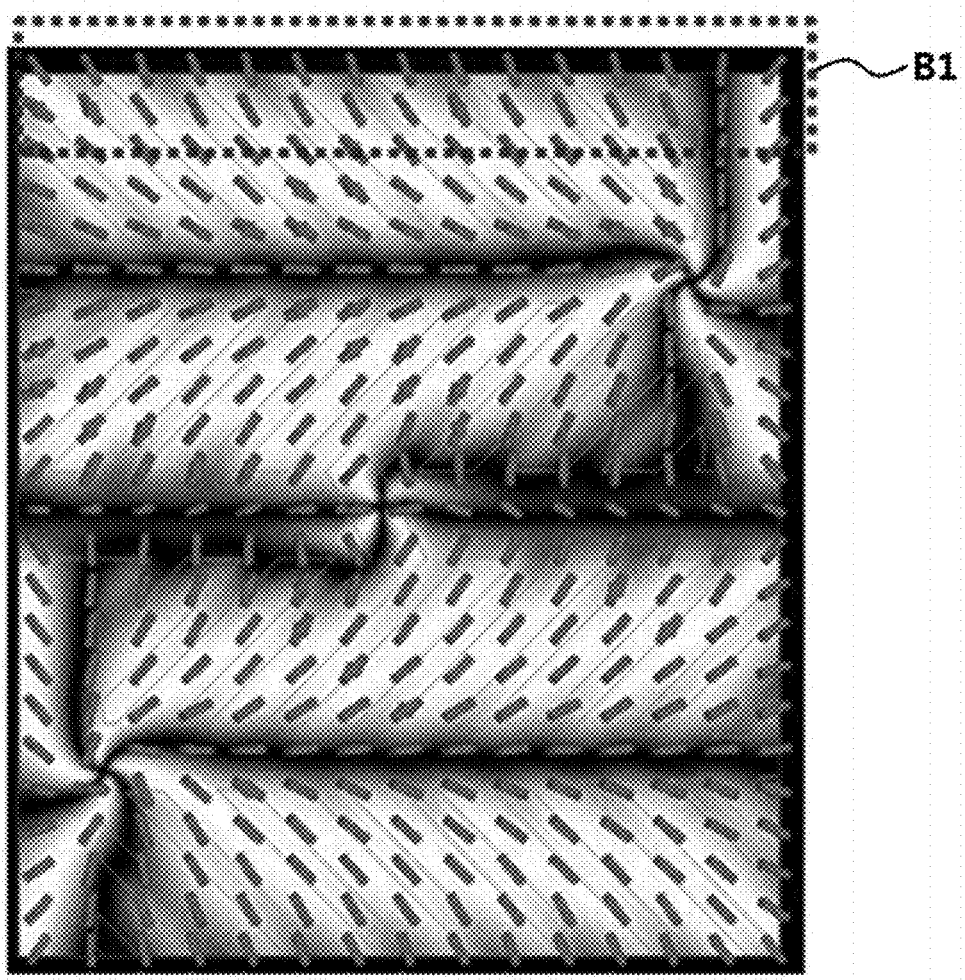
FIG. 6 illustrates directions in which liquid crystal molecules are inclined (or oriented) in a liquid crystal display according to a comparative embodiment.
Figure 7:
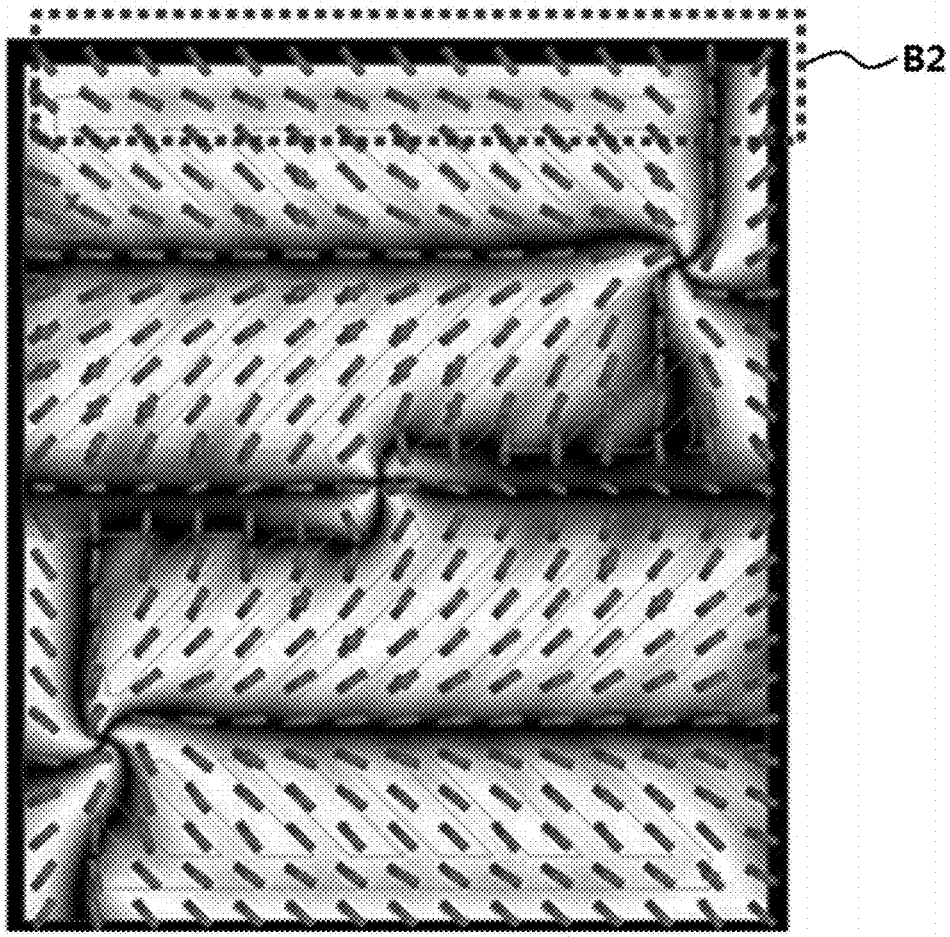
FIG. 7 illustrates directions in which liquid crystal molecules are inclined (or oriented) in a liquid crystal display according to an exemplary embodiment.
Figure 8:
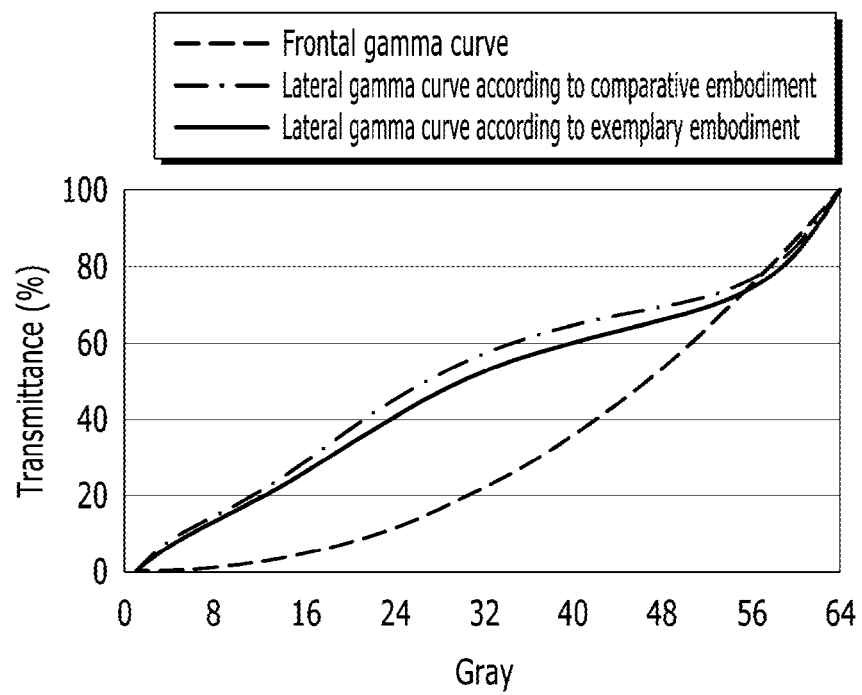
FIG. 8 is a graph illustrating gamma curves associated with a front (or center) and a side of a liquid crystal display according to an exemplary embodiment, as well as a gamma curve associated with a side of a liquid crystal display according to a comparative embodiment.

FIG. 5 is a schematic plan view illustrating one pixel of a liquid crystal display according to a comparative embodiment, and FIG. 6 illustrates directions in which liquid crystal molecules are inclined in the liquid crystal display according to the comparative embodiment. FIG. 7 illustrates directions in which liquid crystal molecules are inclined in a liquid crystal display according to an exemplary embodiment, e.g., the liquid crystal display described with reference to FIG. 1, FIG. 2, FIG. 3, and FIG. 4). FIG. 8 is a graph illustrating gamma curves associated with a front (or center) and a side of a liquid crystal display according to the exemplary embodiment, as well as a gamma curve associated with a side of a liquid crystal display according to the comparative embodiment.

As shown in FIG. 5, in the liquid crystal display according to the comparative embodiment, the first subpixel electrode 191*h* and second subpixel electrode 191*l* respectively include T-shaped stems including the horizontal stems 192*h* and 192*l* and the vertical stems 193*h* and 193*l*. In addition, the first sub-pixel electrode 191*h* and the second sub-pixel electrode 191*l* further include a plurality of minute branches 194*h* and 194*l* which extend from the horizontal stems 192*h* and 192*l* and the vertical stems 193*h* and 193*l*, respectively. The liquid crystal display according to the comparative embodiment is different from the liquid crystal display according to an embodiment in that the first subpixel electrode 191h and second subpixel electrode 191l include no outer stems.

Referring to FIG. 6, in the liquid crystal display according to the comparative embodiment, liquid crystal molecules positioned at an edge B1 of a pixel are inclined at angles that are significantly greater than 45 degrees with respect to the horizontal stems 192h and 192l, as a result of action in a vertical fringe field. In contrast, liquid crystal molecules 31 positioned near the horizontal stems 192h and 192l are inclined at angles of about 45 degrees with respect to the horizontal stems 192h and 192l. Given the significant angle differences, characteristics of an image viewed from a center-front position with respect to the liquid crystal display may be significantly different from those of the image viewed from a side (or lateral) position with respect to the liquid crystal display.

Referring to FIG. 7, in the liquid crystal display according to the exemplary embodiment, since the outer stems are adjacent to an edge B2 of a pixel, liquid crystal molecules positioned at the edges B2 may be oriented substantially parallel to minute branches 194h or 194l. Accordingly, liquid crystal molecules 31 positioned at the edges of the pixel as well as liquid crystal molecules 31 positioned near the horizontal stems 192h and 192l may be oriented at angles of about 45 degrees with respect to the horizontal stems 192h and 192l. Given the substantially consistent orientations of liquid crystal molecules, side visibility associated with the exemplary embodiment may be enhanced over side visibility associated with the comparative embodiment.

As shown in FIG. 8, a frontal gamma curve (associated with a center-front position with respect to a liquid crystal display) is different from lateral gamma curves (associated with a side position with respect to the liquid crystal display). If a lateral gamma curve is substantially close to the frontal gamma curve, characters of an image viewed at the side position may be similar to characters of the image viewed at the center-front position, such that the side visibility may be substantially satisfactory.

The lateral gamma curve of the liquid crystal display according to the exemplary embodiment is closer to the frontal gamma curve than the lateral gamma curve of the liquid crystal display according to the comparative embodiment. Therefore, the side visibility associated with the exemplary embodiment is enhanced over the side visibility associated with the comparative embodiment.

Figure 9:
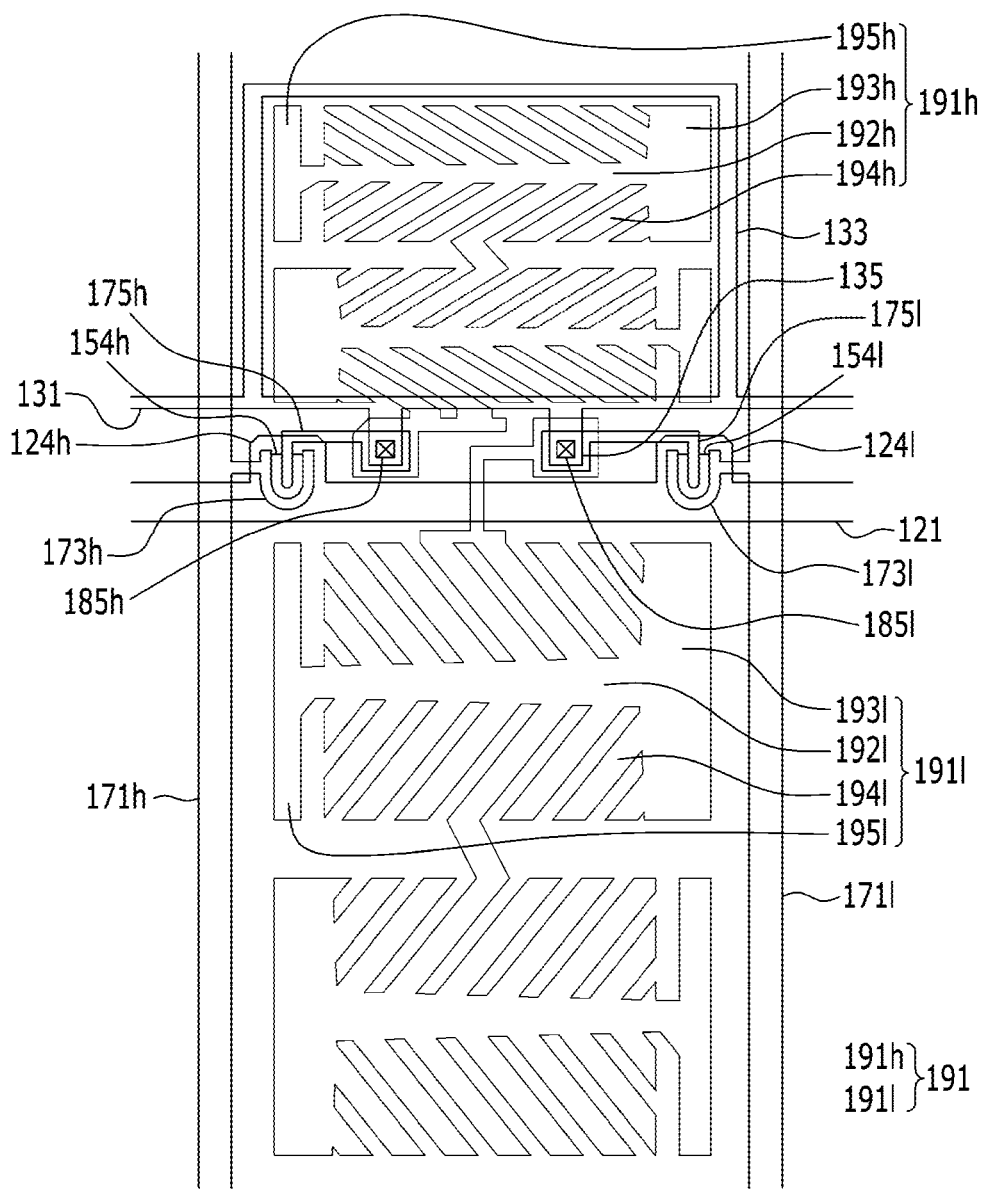
FIG. 9 is a schematic plan view illustrating one pixel of a liquid crystal display according to an embodiment.

FIG. 9 is a schematic plan view illustrating one pixel of a liquid crystal display according to an embodiment. Some features of the liquid crystal display associated with FIG. 9 may be identical or analogous to some features described with reference to one of more of FIG. 1, FIG. 2, FIG. 3, and FIG. 4.

Referring to FIG. 9, the pixel electrode 191 of the liquid crystal display includes T-shaped stems, minute branches 194h and 194l extending from the T-shaped stems, and outer stems (or bars) 195h and 195l directly connected to end portions of the T-shaped stems.

The outer stems 195h and 195l are directly connected to end portions of the T-shaped stem and are positioned at edges of the first subpixel area PXa and the second subpixel area PXb. Specifically, the outer stems 195h and 195l are positioned at left and right edges of first subpixel area PXa and the second subpixel area PXb. The outer stems 195h and 195l are formed to have rod-like shapes (or bar structures). The outer stems 195h and 195l extend parallel to the vertical stems 193h and 193l. The outer stems 195h and 195l are directly connected to end portions of the horizontal stems 192h and 192l. For vertical stems 193h and 193l that are positioned at the left edges of the first subpixel area PXa and the second subpixel area PXb, the corresponding outer stems 195h and 194l are positioned at the right edges of the first subpixel area PXa and the second subpixel area PXb. For vertical stems 193h and 193l that are positioned at the right edges of the first subpixel area PXa and the second subpixel area PXb, the corresponding outer stems 195h and 194l are positioned at the left edges of the first subpixel area PXa and the second subpixel area PXb. The outer stems 195h and 195l are separated from minute branches 194h and 194l that are adjacent to the outer stems 195h and 195l by a predetermined distance.

Figure 10:
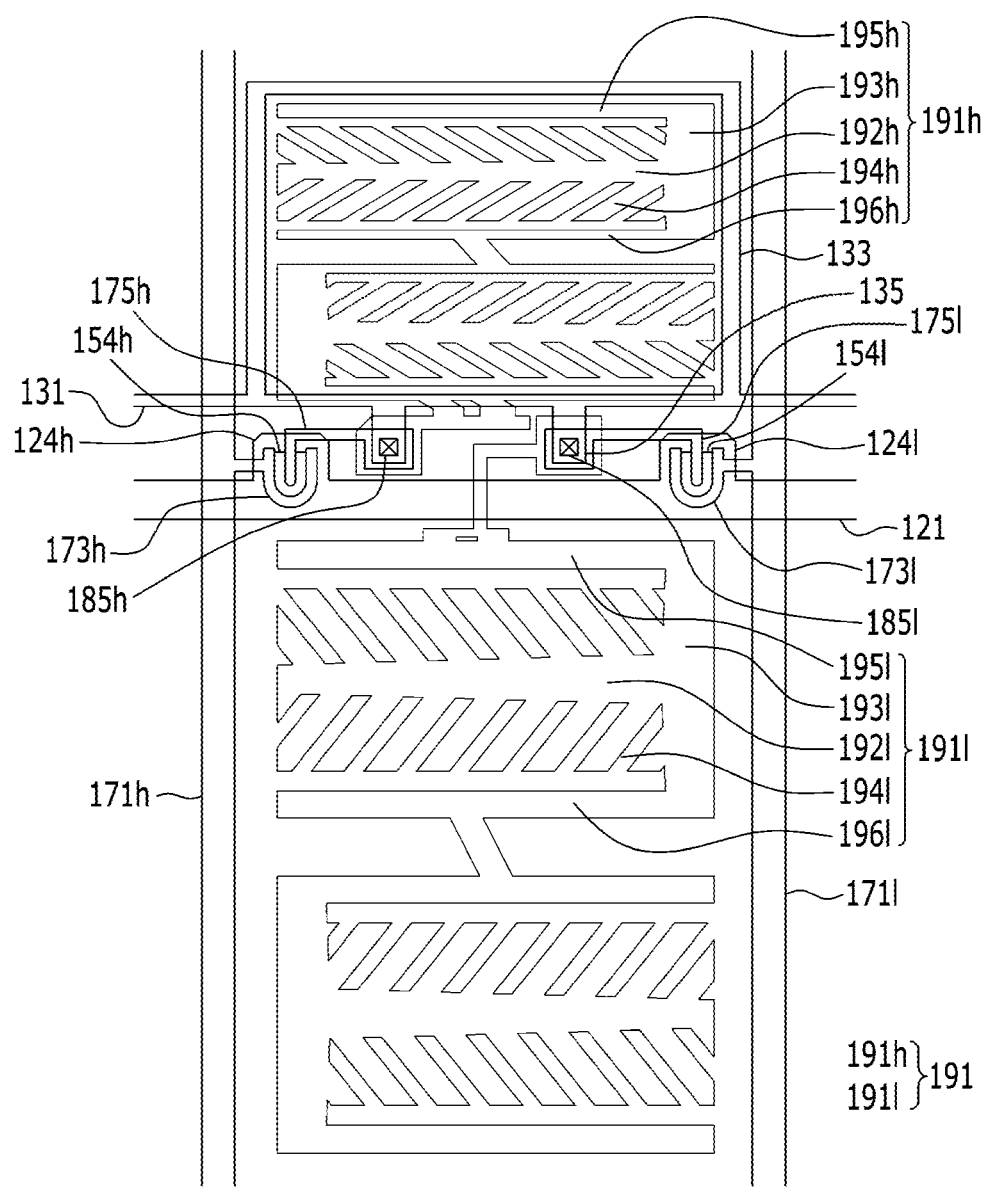
FIG. 10 is a schematic plan view illustrating one pixel of a liquid crystal display according to an embodiment.

FIG. 10 is a top plan view illustrating one pixel of a liquid crystal display according to an embodiment. Some features of the liquid crystal display associated with FIG. 10 may be identical or analogous to some features described with reference to one of more of FIG. 1, FIG. 2, FIG. 3, and FIG. 4.

Referring to FIG. 10, the pixel electrode 191 of the liquid crystal display includes T-shaped stems, minute branches 194h and 194l extending from the T-shaped stems, and outer stems (or bars) 195h and 195l connected to end portions of the T-shaped stems. The pixel electrode 191 further includes auxiliary stems (or bars) 196h and 196l positioned at central portions of the first subpixel area PXa and the second subpixel area PXb.

The outer stems 195h and 195l and the auxiliary stems 196h and 196l are formed to have rod-like shapes (or bar structures). The outer stems 195h and 195l and the auxiliary stems 196h and 196l may extend parallel to one another and to the horizontal stems 192h and 192l. A length of the auxiliary stems 196h and 196l may be substantially equal to that of the outer stems 195h and 195l.

Each of the first subpixel electrode 191h and the second subpixel electrode 191l includes two T-shaped stems, and minute branches 194h and 194l extend from the T-shaped stems in at least four different directions. The T-shaped stems may be vertically disposed. Each of auxiliary stems 196h and 196l may be positioned between two immediately neighboring T-shaped stems. Auxiliary stems 196h and 196l extend from T-shaped stems. Particularly, auxiliary stems 196h and 196l may extend from vertical stems 193h and 193l. Auxiliary stems 196h and 196l are separated from minute branches 194h and 194l that are adjacent to the auxiliary stems 196h and 196l by a predetermined distance.

Figure 11:
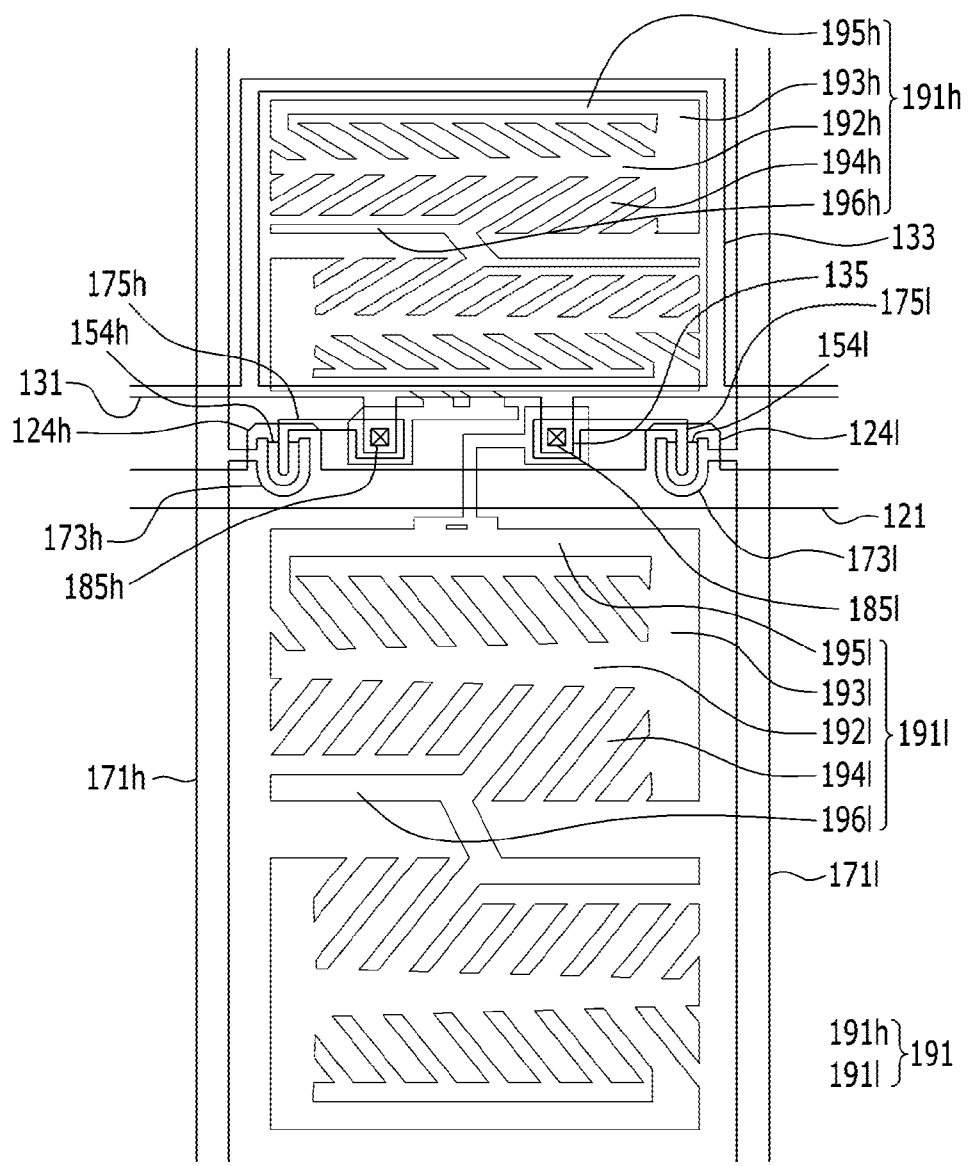
FIG. 11 is a schematic plan view illustrating one pixel of a liquid crystal display according to an embodiment.

FIG. 11 is a top plan view illustrating one pixel of a liquid crystal display according to an embodiment. Some features of the liquid crystal display associated with FIG. 11 may be identical or analogous to some features described with reference to one of more of FIG. 1, FIG. 2, FIG. 3, and FIG. 4.

Referring to FIG. 11, the pixel electrode 191 of the liquid crystal display includes T-shaped stems, minute branches 194h and 194l extending from the T-shaped stems, outer stems (or bars) 195h and 195l connected to end portions of the T-shaped stems, and auxiliary stems (or bars) 196h and 196l positioned at central portions of the first subpixel area PXa and the second subpixel area PXb.

The outer stems 195h and 195l and the auxiliary stems 196h and 196l have rod-like shapes. The outer stems 195h and 195l and the auxiliary stems 196h and 196l may extend parallel to the horizontal stems 192h and 192l. A length of the auxiliary stems 196h and 196l may be approximately half of that of the outer stems 195h and 195l.

Each of the first subpixel electrode 191h and the second subpixel electrode 191l includes two T-shaped stems, and minute branches 194*h* and 194*l* extend from the T-shaped stems in at least four different directions. The T-shaped stems may be vertically disposed. Each of auxiliary stems 196*h* and 196*l* may be positioned between two immediately neighboring T-shaped stems. The auxiliary stems 196*h* and 196*l* extend from T-shaped stems. The auxiliary stems 196*h* and 196*l* are separated from minute branches 194*h* and 194*l* that are adjacent to the auxiliary stems 196*h* and 196*l* by a predetermined distance.

Figure 12:
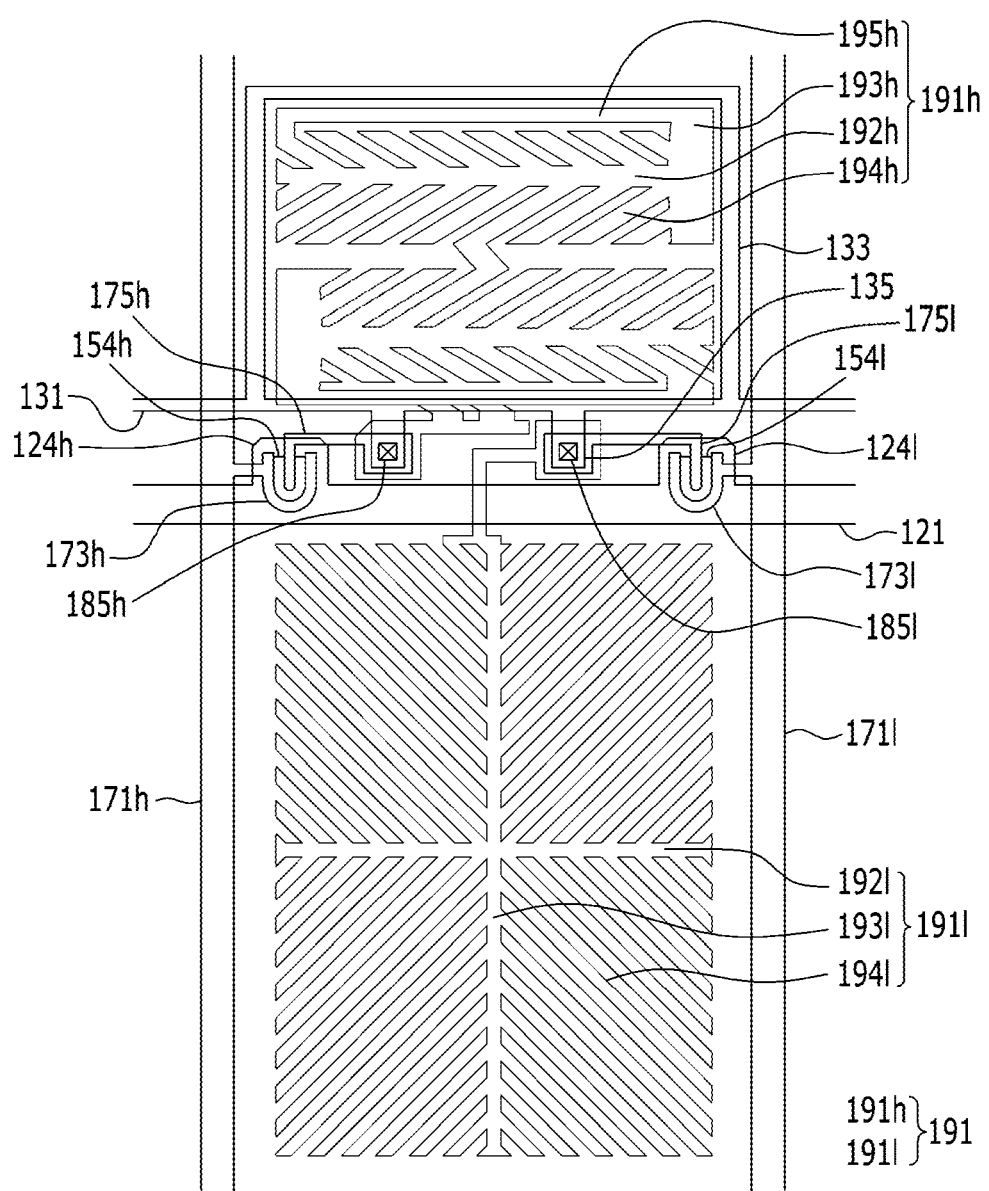
FIG. 12 is a schematic plan view illustrating one pixel of a liquid crystal display according to an embodiment.

FIG. 12 is a top plan view illustrating one pixel of a liquid crystal display according to an embodiment. Some features of the liquid crystal display associated with FIG. 12 may be identical or analogous to some features described with reference to one of more of FIG. 1, FIG. 2, FIG. 3, and FIG. 4.

Referring to FIG. 12, the first subpixel electrode 191*h* of the liquid crystal display includes a T-shaped stem (having a first horizontal stem 192*h* and a first vertical stem 193*h*), first minute branches 194*h* extending from the T-shaped stem, and an outer stem 195*h* connected to one end portion of the T-shaped stem.

The second subpixel electrode 191*l* includes a cross-shaped stem (having a second horizontal stem 192*l* and a second vertical stem 193*l*) and second minute branches 194*l* extending from the cross-shaped stem.

Since the first subpixel electrode has the outer stem 195*h*, satisfactory side visibility associated with the display device may be attained. Further, since the second subpixel electrode has the cross-shaped stem, satisfactory transmittance associated with the display device can be obtained.

In summary, referring to FIG. 2, FIG. 3, FIG. 4, FIG. 9, FIG. 10, FIG. 11, and FIG. 12, a display device may include a liquid crystal layer 3 and a pixel electrode 191. The pixel electrode 191 may overlap the liquid crystal layer 3. The pixel electrode 191 may include a bar 192*h*, a bar 193*h*, a bar 195*h*, and a plurality of first-type branches. The bar 193*h* may be directly connected to a first end of the bar 192*h* (e.g., right end of the top bar 192*h* in FIG. 2). The bar 195*h* may be directly connected to a first end of the bar 193*h* (e.g., upper end of the top bar 193*h* in FIG. 2) or directly connected to a second end of the bar 192*h* (e.g., left end of the top bar 192*h* in FIG. 9). The first-type branches (e.g., the top slanted branches in FIG. 2) may be slanted with respected to the bar 192*h* (e.g., the top bar 192*h* in FIG. 2) and may be positioned between the bar 195*h* (e.g., the top bar 195*h* in FIG. 2 or FIG. 9) and at least one of the bar 192*h* (e.g., the top bar 192*h* in FIG. 2) and the bar 193*h* (e.g., the top bar 193*h* in FIG. 9).

Referring to, e.g., FIG. 2, the bar 195*h* may be directly connected to the first end of the bar 193*h* (e.g., upper end of the top bar 193*h*) and may extend parallel to the bar 192*h*.

Referring to, e.g., FIG. 9, the bar 195*h* may be directly connected to the second end of the bar 192*h* (e.g., left end of the top bar 192*h*) and may extend parallel to the bar 193*h*.

Referring to, e.g., FIG. 2, the pixel electrode 191 may include a fourth bar (e.g., the top-left vertical bar). A first end of the bar 195*h* (e.g., right end of the top bar 195*h*) may be directly connected to the first end of the bar 193*h* (e.g., upper end of the top bar 193*h*). A second end of the bar 195*h* (e.g., left end of the top bar 195*h*) may be directly connected to a first end of the fourth bar (e.g., upper end of the top-left vertical bar). A second end of the fourth bar (e.g., lower end of the top-left vertical bar) may be directly connected to a first-type branch (e.g., the top-left branch) among the first-type branches.

Referring to, e.g., FIG. 10, the pixel electrode 191 may include a bar 196*h*. The bar 195*h* may be directly connected to the first end (e.g., upper end) of the bar 193*h*. The bar 196*h* may be directly connected to a second end (e.g., lower end) of the bar 193*h*. The bar 192*h* may be positioned between the bar 195*h* and the bar 196*h* and may extend parallel to the bar 196*h*.

Referring to, e.g., FIG. 11, the pixel electrode 191 may include a bar 196*h* and a second-type branch. The bar 192*h* may be positioned between the plurality of first-type branches and the second-type branch. The second-type branch may be slanted with respect to the bar 192*h* and may be directly connected to each of the bar 192*h* and the bar 196*h*. The bar 196*h* may be shorter than the bar 195*h*. A first end (e.g., upper end) of the second-type branch may be directly connected to the bar 192*h*. A second end (e.g., lower end) of the second-type branch may be directly connected to the bar 196*h*. The pixel electrode 191 may include a third-type branch. The third-type branch may extend parallel to the second-type branch and may be electrically connected through the second-type branch to the bar 196*h*.

Referring to, e.g., FIG. 11, the third-type branch may be shorter than the second-type branch and may be positioned between the bar 192*h* and the bar 196*h*.

Referring to, e.g., FIG. 11, the second-type branch may be longer than the third-type branch and may be positioned between the third-type branch and the bar 193*h*.

Referring to, e.g., FIG. 11, the third-type branch may be shorter than the second-type branch and may be positioned between the second-type branch and the bar 193*h*.

Referring to, e.g., FIG. 11, the third-type branch may be shorter than the second-type branch and may be directly connected to the bar 193*h*.

Referring to e.g., FIG. 2, distances from the first-type branches to the bar 195*h* may be equal to one another.

Referring to e.g., FIG. 2, the display device may include a transistor (e.g., the transistor that includes the electrodes 124*h*, 173*h*, and 175*h*) that is electrically connected to the pixel electrode 191. The bar 195*h* (e.g., the lower bar 195*h*) may be positioned between the transistor and the plurality of first-type branches (e.g., the bottom branches of the electrode 191*h*) in a plan view of the display device.

Referring to FIG. 2, FIG. 3, FIG. 4, FIG. 9, FIG. 10, FIG. 11, and FIG. 12, the pixel electrode 191 may include a lower bar 192*h*, a lower bar 193*h*, a lower bar 195*h*, and a plurality of second-type branches (e.g., bottom branches of the electrode 191*h*). The lower bar 193*h* may be directly connected to a first end (e.g., left end) of the lower bar 192*h*. The lower bar 195*h* may be directly connected to a first end of the lower bar 193*h* (e.g., lower end of the lower bar 193*h* in FIG. 2) or directly connected to a second end of the lower bar 192*h* (e.g., right end of the lower bar 192*h* in FIG. 9). The lower bar 195*h* may be electrically connected to the upper bar 195*h* (through the bars 193*h*, 192*h*, and some branches). The second-type branches may be slanted with respected to the lower bar 192*h* and may be positioned between the lower bar 195*h* and at least one of the lower bar 192*h* and the lower bar 193*h*.

Referring to e.g., FIG. 9, the upper bar 195*h* may be positioned at a first edge (e.g., left edge) of the pixel electrode 191. The lower bar 195*h* may be poisoned at a second edge (e.g., right edge) of the pixel electrode 191. The second edge of the pixel electrode 191 may be opposite the first edge of the pixel electrode 191.

Referring to, e.g., FIG. 2 or FIG. 9, at least one of the plurality of first-type branches (e.g., top branches of the electrode 191*h*) and the plurality of second-type branches (e.g., bottom branches of the electrode 191*h*) and at least one of the upper bar 192h and the lower bar 192h may be positioned between the upper bar 195h and the lower bar 195h.

Referring to FIG. 2, FIG. 3, FIG. 4, FIG. 9, FIG. 10, FIG. 11, and FIG. 12, the pixel electrode 191 may include a bar 192l, a bar 193l, a bar 195l, and a plurality of second-type branches (e.g., bottom branches of the electrode 191l). The bar 193l (e.g., the lower bar 193l) may be directly connected to a first end of the bar 192l (e.g., the left end of the lower bar 192l). The bar 195l (e.g., the lower bar 195l) may be directly connected to a first end of the bar 193l (e.g., the lower end of the lower bar 193l in FIG. 2) or directly connected to a second end of the bar 192l (e.g., the right end of the lower bar 193l in FIG. 9). The bar 195l may be electrically insulated from the bar 195h. The second-type branches may be slanted with respected to the bar 192l and may be positioned between the bar 195l and at least one of the bar 192l and the bar 193l.

Referring to e.g., FIG. 2 or FIG. 9, the bar 195h may be positioned at a first edge (e.g., top edge or left edge) of the pixel electrode 191. The bar 195l may be poisoned at a second edge (e.g., bottom edge or right edge) of the pixel electrode 191. The second edge of the pixel electrode 191 may be opposite the first edge of the pixel electrode 191.

Referring to, e.g., FIG. 2 or FIG. 9, the display device may include a gate line 121, a transistor Qh (which includes the electrodes 124h, 173h, and 175h), and a transistor Ql (which includes the electrodes 124l, 173l, and 175l). The transistor Qh may be electrically connected to each of the bar 195h and the gate line 121. The transistor Ql may be electrically connected to each of the bar 195l and the gate line 121. The transistor Qh and the transistor Ql may be positioned between the bar 195h and the bar 195l in a plan view of the display device. The gate line 121 may be electrically connected to each of the gate electrode 124h of the transistor Qh and the gate electrode 124l of the transistor Ql and may extend substantially parallel to each of the bars 195h and 195l.

While some embodiments have been described as examples, possible embodiments are not limited to the described embodiments. Embodiments are intended to cover various modifications and equivalent arrangements applicable within the spirit and scope defined by the appended claims.

What is claimed is:

1. A liquid crystal display comprising:
   a first substrate and a second substrate configured to face each other;
   a pixel electrode disposed on the first substrate;
   a common electrode disposed on the second substrate;
   a liquid crystal layer disposed between the first substrate and the second substrate,
   wherein the pixel electrode includes
   a T-shaped stem configured to have a horizontal stem and a vertical stem;
   a plurality of minute branches configured to extend from the T-shaped stem; and
   an outer stem connected to one end portion of the T-shaped stem, and disposed at an edge of a pixel area,
   wherein the outer stem connects the minute branches, which are connected to a first end portion of the horizontal stem, to the vertical stem, which is connected to a second end portion of the horizontal stem, and
   wherein a plurality of minute branches positioned between the minute branches connected to the first end portion of the horizontal stem and the vertical stem connected to the second end portion of the horizontal stem are separated from the outer stem at a predetermined distance.

2. The liquid crystal display of claim 1, wherein the outer stem is formed to have a rod-like shape.

3. The liquid crystal display of claim 1, wherein the pixel electrode includes two T-shaped stems, and the minute branches are extended in four different directions from each of the T-shaped stems.

4. The liquid crystal display of claim 3, wherein the outer stem is connected to a first end portion of each of the T-shaped stems.

5. The liquid crystal display of claim 4, wherein the outer stem is disposed at upper and lower edges of the pixel area, and is extended in a direction parallel to the horizontal stem.

6. The liquid crystal display of claim 1, wherein the pixel electrode includes a first subpixel electrode and a second subpixel electrode, to which different voltages are applied, and
   each of the first subpixel electrode and the second subpixel electrode includes the T-shaped stem, the plurality of minute branches, and the outer stem.

7. The liquid crystal display of claim 1, wherein the outer stem is extended from a first end portion of the horizontal stem.

8. The liquid crystal display of claim 7, wherein the outer stem is extended in a direction parallel to the vertical stem.

9. The liquid crystal display of claim 8, wherein the outer stem is disposed at left and right edges of the pixel area.

10. The liquid crystal display of claim 1, wherein the pixel electrode further includes an auxiliary stem positioned at a central portion of the pixel area.

11. The liquid crystal display of claim 10, wherein the outer stem and the auxiliary stem are formed to have a rod-like shape.

12. The liquid crystal display of claim 11, wherein the pixel electrode includes two T-shaped stems, and the minute branches are extended in four different directions from each of the T-shaped stems, and
    the auxiliary stem is positioned between the two T-shaped stems.

13. The liquid crystal display of claim 12, wherein the auxiliary stem is extended from each of the T-shaped stems.

14. The liquid crystal display of claim 12, wherein the auxiliary stem is extended from the minute branches.

15. The liquid crystal display of claim 10, wherein the outer stem and the auxiliary stem are extended in a direction parallel to the horizontal stem.

16. The liquid crystal display of claim 1, wherein:
    the pixel electrode includes a first subpixel electrode and a second subpixel electrode, to which different voltages are applied,
    the first subpixel electrode includes the T-shaped stem having a first horizontal stem and a first vertical stem, with first minute branches extended from the T-shaped stem, and
    the second subpixel electrode includes a cross-shaped stem having a second horizontal stem and a second vertical stem, with second minute branches extended from the cross-shaped stem.

17. The liquid crystal display of claim 16, wherein a data voltage applied to the first subpixel electrode is higher than a data voltage applied to the second subpixel electrode.

18. The liquid crystal display of claim 1, wherein the outer stem is longer than the vertical stem.

19. The liquid crystal display of claim 18, wherein the pixel electrode includes a connected section, wherein the outer stem is connected through the connected section to a minute branch among the minute branches, and wherein the connected section extends parallel to the vertical stem, is shorter than the vertical stem, and is directly connected to each of the outer stem and the minute branch.

* * * * *